US012423581B2

(12) United States Patent
Amizadeh et al.

(10) Patent No.: US 12,423,581 B2
(45) Date of Patent: Sep. 23, 2025

(54) SELECTING A NEURAL NETWORK ARCHITECTURE FOR A SUPERVISED MACHINE LEARNING PROBLEM

(71) Applicant: Microsoft Technology Licensing, LLC, Redmond, WA (US)

(72) Inventors: Saeed Amizadeh, Seattle, WA (US); Ge Yang, Bellevue, WA (US); Nicolo Fusi, Watertown, MA (US); Francesco Paolo Casale, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/643,691

(22) Filed: Apr. 23, 2024

(65) Prior Publication Data
US 2024/0273370 A1   Aug. 15, 2024

Related U.S. Application Data

(63) Continuation of application No. 15/976,514, filed on May 10, 2018, now Pat. No. 11,995,538.

(51) Int. Cl.
*G06N 3/08* (2023.01)
*G06N 3/045* (2023.01)

(52) U.S. Cl.
CPC ............. *G06N 3/08* (2013.01); *G06N 3/045* (2023.01)

(58) Field of Classification Search
None
See application file for complete search history.

(56) References Cited

U.S. PATENT DOCUMENTS 9,659,248 B1    5/2017  Barbosa et al.
2006/0224533 A1 10/2006 Thaler

FOREIGN PATENT DOCUMENTS

WO     2018075995 A1    4/2018

OTHER PUBLICATIONS

Philipp, George, Dawn Song, and Jaime G. Carbonell. "The exploding gradient problem demystified-definition, prevalence, impact, origin, tradeoffs, and solutions." arXiv preprint arXiv:1712.05577. 2017. (Year: 2017).*

(Continued)

*Primary Examiner* — Vincent Gonzales
(74) *Attorney, Agent, or Firm* — Schwegman Lundberg & Woessner, P.A.

(57) ABSTRACT

Systems and methods, for selecting a neural network for a machine learning (ML) problem, are disclosed. A method includes accessing an input matrix, and accessing an ML problem space associated with an ML problem and multiple untrained candidate neural networks for solving the ML problem. The method includes computing, for each untrained candidate neural network, at least one expressivity measure capturing an expressivity of the candidate neural network with respect to the ML problem. The method includes computing, for each untrained candidate neural network, at least one trainability measure capturing a trainability of the candidate neural network with respect to the ML problem. The method includes selecting, based on the at least one expressivity measure and the at least one trainability measure, at least one candidate neural network for solving the ML problem. The method includes providing an output representing the selected at least one candidate neural network.

20 Claims, 6 Drawing Sheets

(56) References Cited

OTHER PUBLICATIONS

Ahmed K, Torresani L. Maskconnect: Connectivity learning by gradient descent. In Proceedings of the European conference on computer vision (ECCV) 2018. pp. 349-365. (Year: 2018).*

Elsken T, Metzen JH, Hutter F. Neural architecture search: A survey. Journal of Machine Learning Research. 2019;20(55): 1-21. (Year: 2019).*

First Office Action Received for Chinese Application No. 201980031270.X, mailed on Jul. 8, 2024, 20 pages. (English Translation Provided).

Office Action Received for Korean Application No. 10-2020-7032320, mailed on Apr. 29, 2025, 12 pages. (English translation Provided).

Notice of Allowance Received for Chinese Application No. 201980031270.X, mailed on Jan. 28, 2024, 04 pages. (English Translation Provided).

Office Action received for Canada Application No. 3097036, mailed on Apr. 25, 2025, 6 Pages.

* cited by examiner

SELECTING A NEURAL NETWORK ARCHITECTURE FOR A SUPERVISED MACHINE LEARNING PROBLEM

CROSS-REFERENCE TO RELATED APPLICATIONS

This application is a Continuation Application under 35 USC § 120 of U.S. patent application Ser. No. 15/976,514, entitled "Selecting A Neural Network Architecture For A Supervised Machine Learning Problem," filed on May 10, 2018, and is herein incorporated by reference in its entirety.

TECHNICAL FIELD

The subject matter disclosed herein generally relates to methods, systems, and machine-readable storage media for selecting a neural network architecture for a supervised machine learning problem.

BACKGROUND

Multiple different types of neural network architectures (for example convolution neural networks, feedforward neural networks, and others) are known. Selecting a neural network architecture (as well as a sub-architecture within a given architecture type) for solving a given machine learning problem may be challenging.

SUMMARY

The present disclosure generally relates to machines configured to select a neural network architecture for solving a machine learning problem, including computerized variants of such special-purpose machines and improvements to such variants, and to the technologies by which such special-purpose machines become improved compared to other special-purpose machines that provide technology for neural networks. In particular, the present disclosure addresses systems and methods for selecting a neural network architecture for solving a machine learning problem in a given machine learning problem space.

According to some aspects of the technology described herein, a system includes processing hardware and a memory. The memory stores instructions which, when executed by the processing hardware, cause the processing hardware to perform operations. The operations include accessing a machine learning problem space associated with a machine learning problem and a plurality of untrained candidate neural networks for solving the machine learning problem. The operations include computing, for each untrained candidate neural network, at least one expressivity measure capturing an expressivity of the candidate neural network with respect to the machine learning problem. The operations include computing, for each untrained candidate neural network, at least one trainability measure related to a trainability of the candidate neural network with respect to the machine learning problem. The operations include selecting, based on the at least one expressivity measure and the at least one trainability measure, at least one candidate neural network for solving the machine learning problem. The operations include providing an output representing the selected at least one candidate neural network.

According to some aspects of the technology described herein, a machine-readable medium stores instructions which, when executed by one or more machines, cause the one or more machines to perform operations. The operations include accessing a machine learning problem space associated with a machine learning problem and a plurality of untrained candidate neural networks for solving the machine learning problem. The operations include computing, for each untrained candidate neural network, at least one expressivity measure capturing an expressivity of the candidate neural network with respect to the machine learning problem. The operations include computing, for each untrained candidate neural network, at least one trainability measure capturing a trainability of the candidate neural network with respect to the machine learning problem. The operations include selecting, based on the at least one expressivity measure and the at least one trainability measure, at least one candidate neural network for solving the machine learning problem. The operations include providing an output representing the selected at least one candidate neural network.

According to some aspects of the technology described herein, a method includes accessing an input matrix. The method includes accessing a machine learning problem space associated with a machine learning problem and a plurality of untrained candidate neural networks for solving the machine learning problem. The method includes computing, for each untrained candidate neural network, at least one expressivity measure capturing an expressivity of the candidate neural network with respect to the machine learning problem. The method includes computing, for each untrained candidate neural network, at least one trainability measure capturing a trainability of the candidate neural network with respect to the machine learning problem. The method includes selecting, based on the at least one expressivity measure and the at least one trainability measure, at least one candidate neural network for solving the machine learning problem. The method includes providing an output representing the selected at least one candidate neural network.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
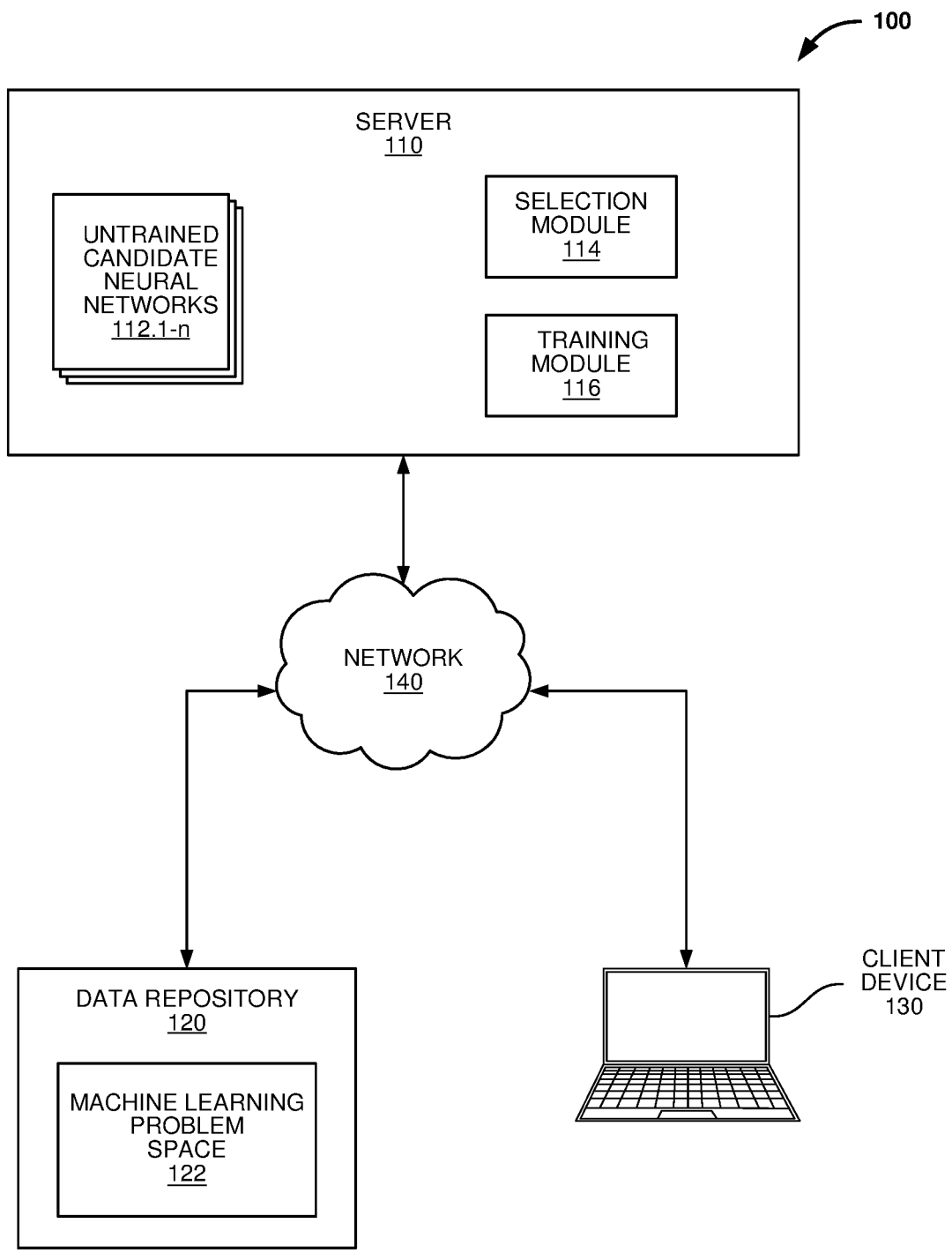
FIG. 1 illustrates an example system in which selecting a neural network architecture for solving a machine learning problem may be implemented, in accordance with some embodiments.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As set forth above, multiple different types of neural network architectures (for example feedforward neural networks, convolutional neural networks, recurrent neural networks, and others) are known. Selecting a high-performing neural network architecture for solving a given machine learning problem (e.g., a regression problem, a ranking problem, or a classification problem, such as classifying data in a given space, such as classifying images of birds by the type of bird in the image) may be challenging.

Some aspects of the technology described herein are directed to solving the technical problem of selecting, from a set of neural network architectures, a neural network architecture for solving a given machine learning problem before the neural network architecture is trained. Advantageously, as a result of some aspects, a high-performing neural network architecture is trained to solve the given machine learning problem, and less desirable architectures are not trained. This saves computational time and increases efficiency, without resulting in a non-high-performing neural network being used.

In some cases, the solution to this problem is implemented at a server. The server accesses, via a data repository, a machine learning problem space associated with a machine learning problem and a plurality of untrained candidate neural networks for solving the machine learning problem. The server computes, for each untrained candidate neural network, at least one expressivity measure capturing the expressivity of the candidate neural network with respect to the machine learning problem. The server computes, for each untrained candidate neural network, at least one trainability measure capturing the trainability of the candidate neural network with respect to the machine learning problem. The server selects, based on the at least one expressivity measure, at least one trainability measure and the architecture of a candidate neural network, at least one candidate neural network for solving the machine learning problem. The server provides an output representing the selected at least one candidate neural network.

In some cases, the selected at least one candidate neural network is partially or fully trained to solve the machine learning problem. As used herein, a neural network being "partially or fully trained" may include being trained for a few epochs or trained until some indicator of convergence has been met. The trained at least one candidate neural network is run on the machine learning problem space in order to solve the machine learning problem. The server then provides a solution to the machine learning problem generated by the trained at least one candidate neural network.

According to some examples, the at least one expressivity measure represents a measure (e.g., magnitude or angle) of separation, by the untrained candidate neural network, of samples from the classification problem space. According to some examples, the at least one trainability measure represents a function of the gradients at the last layer and the first layer given samples from the machine learning problem space. According to some examples, the expressivity and trainability measures may include quantities, measures, or statistics of a neural network that capture different properties of the architecture, such as expressivity and trainability.

FIG. 1 illustrates an example system 100 in which selecting a neural network architecture for solving a machine learning problem may be implemented, in accordance with some embodiments. As shown, the system 100 includes a server 110, a data repository 120, and a client device 130 connected to one another via a network 140. The network 140 includes one or more of the Internet, an intranet, a local area network, a wide area network, a wired network, a wireless network, a cellular network, a WiFi network, and the like.

The client device 130 may be a laptop computer, a desktop computer, a mobile phone, a tablet computer, a smart television with a processor and a memory, a smart watch, and the like. The client device 130 may be used to display an output to a user or to receive an input from a user.

The data repository 120 may be implemented as a database or any other data storage structure. As shown, the data repository stores a machine learning problem space 122. The machine learning problem space 122 includes data to be classified by a neural network. For example, the machine learning problem space 122 may include photographs of birds to be classified by type of bird or email messages to be classified as "important email," "unimportant email" or "spam."

The server 110 may include one or more servers. The server 110 may be implemented as a server farm including multiple servers. As shown, the server 110 stores untrained candidate neural networks 112.1-$n$ (where n is a positive integer greater than or equal to two), a selection module 114, and a training module 116. The untrained candidate neural networks 112.1-$n$ are neural networks that may be used for various classification tasks. For example, the untrained candidate neural networks 112.1-$n$ may include untrained versions of a convolution neural network or a feedforward neural network.

The selection module 114 selects at least one of the untrained candidate neural networks 112.1-$n$ for training to solve the machine learning problem associated with the machine learning problem space 122. More details of example operations of the selection module are provided in conjunction with FIG. 2. The training module 116 trains the selected (by the selection module 114) neural network(s) (from the untrained candidate neural networks 112.1-$n$) to solve the machine learning problem. After training, the trained neural networks may be used to solve the machine learning problem by classifying the data in the machine learning problem space 122 (or another problem space).

Figure 2:
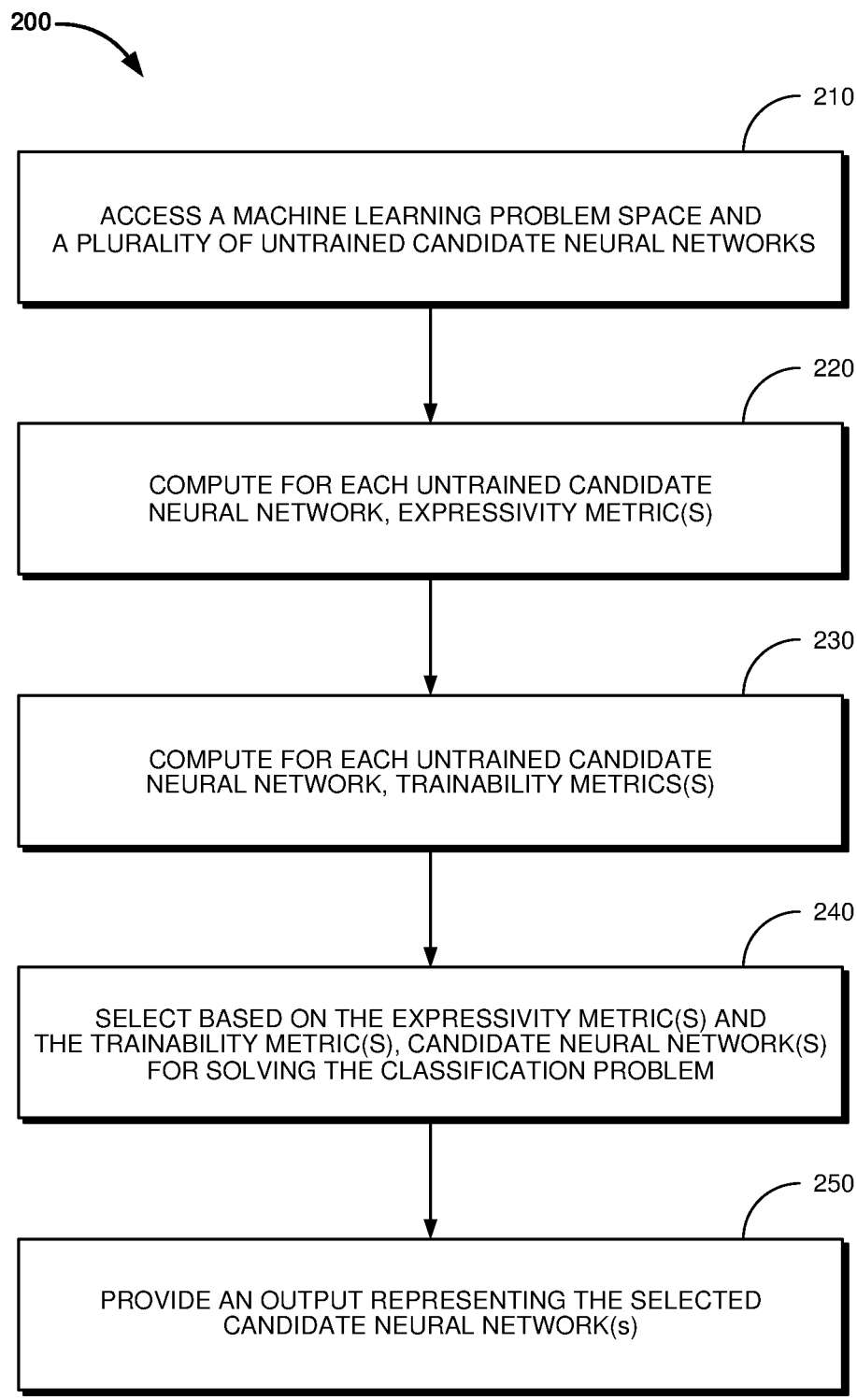
FIG. 2 illustrates a flow chart for an example method for selecting a neural network architecture for solving a machine learning problem, in accordance with some embodiments.

FIG. 2 illustrates a flow chart for an example method 200 for selecting a neural network architecture for solving a machine learning problem, in accordance with some embodiments. As described below, the method 200 is implemented using the selection module 114 of the server 110 of FIG. 1. However, the method 200 is not limited by the architecture of the system 100 and may be implemented in other architectures or other systems.

At operation 210, the selection module 114 accesses (e.g., via the network 140) the machine learning problem space 122 associated with the machine learning problem to be solved. The selection module 114 accesses the plurality of untrained candidate neural networks 112.1-$n$ for solving the machine learning problem.

At operation 220, the selection module 114 computes, for each untrained candidate neural network 112.1-$n$, expressivity metric(s) related to an expressivity of the candidate neural network with respect to the machine learning problem. The expressivity metric(s) represent a measure of separation, by the untrained candidate neural network, of samples from the machine learning problem space 122. The measure of separation may be a magnitude or an angle.

At operation 230, the selection module 114 computes, for each untrained candidate neural network 112.1-n, trainability metric(s) related to a trainability of the candidate neural network with respect to the machine learning problem.

At operation 240, the selection module 114 selects, based on the expressivity measure(s) and the trainability measure(s), candidate neural network(s) for solving the machine learning problem. The selection is also based on the architecture(s) of the candidate neural network(s). The candidate neural network(s) are selected from the plurality of untrained candidate neural networks 112.1-n. In some cases, the selection module 114 selects the candidate neural network(s) having the expressivity measure(s) exceeding a threshold and the trainability measure(s) within a range. The range is defined by a range minimum and a range maximum.

At operation 250, the selection module 114 provides an output representing the selected candidate neural network(s). In some cases, the training module 116 trains the selected candidate neural network(s) to solve the machine learning problem. The training module 116 runs the trained candidate neural network(s) on the machine learning problem space 122 in order to solve the machine learning problem. The server 110 provides (e.g., to the client device 130 for display thereat, or the data repository 120 for storage thereat) a solution to the machine learning problem generated by the trained candidate neural network(s).

One goal of the technology described herein is to automatically select and configure neural network architectures for a given task. More specifically, given a dataset, some aspects automatically identify the layer types (e.g., convolutional, maxpool, fully connected, etc.), their hyperparameters (e.g., stride size, convolution size), their connections to all other layers, and the total number of layers. Some aspects also identify which training algorithm to use (e.g., stochastic gradient descent, RMSProp, Adam, etc.) and how to initialize the weights (e.g., Glorot, Normal, Laplace, Uniform, etc.).

Some schemes can be grouped based on: (1) how they define the search space over architectures (e.g., unrestricted or restricted); (2) how they explore the space (e.g., reinforcement learning, Monte Carlo Tree Search); (3) what predictive model they use to guide the search (e.g., sequential model based optimization, recurrent neural networks (RNNs), genetic algorithms); and (4) whether they use a cheap surrogate function to more efficiently guide the search. In the case of genetic algorithms and reinforcement learning, points 2 and 3 above are conflated into one, since they jointly learn a predictive model and explore the space.

In some embodiments, the search space is explored by means of sequential model-based optimization (SMBO). An example model in SMBO could be a Bayesian recurrent neural network. A set of characteristics of random neural networks are defined to act as cheap surrogates (or statistics) to the true performance of the neural network. In some cases, other models (e.g., Gaussian processes) that output both the prediction and the uncertainty about the prediction are used. In some cases, the cheap surrogates (or statistics) are not given as an input of the model, but are considered an output. The cheap surrogates may include the trainability and expressivity measures discussed above.

In some extended embodiments, the search space is unrestricted. Reinforcement learning or Monte Carlo Tree Search are used to explore the search space. In some cases, one could also additionally use a representation of the architecture itself to help with the prediction.

Some aspects are directed to two main measures for predicting, before training, the performance of an initial model on a dataset after training. Both measures are statistics of the model collected on random batches from the dataset. In some examples, the batch consists of n points $\{(x_i, y_i)\}_{i=1}^n$; some aspects ignore the labels $y_i$. The model conventionally includes two components: a deep neural network embedding the input space into a latent space, and a fully connected linear layer followed by softmax that turns an embedding into a probability distribution over the set of possible labels. Let f be the former, i.e., the embedding, and suppose it has L layers.

Metric Expressivity is defined according to Expression 1, which approximates to Expression 2. In Expression 1, $\{x_1, \ldots, x_n\}$ is a batch of inputs.

$$\frac{1}{\binom{n}{2}} \sum_{1 \le i < j \le n} \frac{\|f(x_i) - f(x_j)\|^2}{\|x_i - x_j\|^2}, \quad \text{Expression 1}$$

$$E_{x,x' \sim P} \frac{\|f(x) - f(x')\|^2}{\|x - x'\|^2} \quad \text{Expression 2}$$

In Expression 2, E denotes expectation and P is the data distribution for the xs. Intuitively, this measure denotes the propensity of f to expand the input space and pull points apart. A larger metric expressivity should correlate with better performance after training. Variations of this measure includes sampling pairs of (x, x') instead of choosing every pair of a common batch, and choosing other powers than 2 (i.e., $$\frac{\|f(x_i) - f(x_j)\|^p}{\|x_i - x_j\|^p}$$

for some p>0), and other methods for testing the "expansiveness" (propensity to expand the input space) of the neural network.

Gradient deformity, in addition to the metric expressivity features, includes sampling a random gradient vector with respect to the last layer and performing backpropagation after forward computation on each sample $x_i$ to obtain a gradient vector at each preceding layer. Assuming such a fixed input $x_i$ and a fixed last layer gradient vector, let the gradient vector at layer l on parameter w be denoted $$\frac{\partial E}{\partial w^{(l)}}\bigg|_{x=x_i}.$$

Then the gradient deformity of parameter w is defined in Expression 3.

$$\frac{1}{n}\sum_{i=1}^{n}\left|\log\left\|\frac{\partial E}{\partial w^{(L)}}\bigg|_{x=x_i}\right\| - \log\left\|\frac{\partial E}{\partial w^{(1)}}\bigg|_{x=x_i}\right\|\right| \quad \text{Expression 3}$$

In other words, gradient deformity is a measure of how much gradient explosion or vanishing happens on typical data points. The greater this is, the worse it is expected that the trained performance is, because it is expected that training (via stochastic gradient descent (SGD)) is difficult. Variations of this measure includes sampling a new last-layer-gradient-vector for every $x_i$, replacing the summands with Expression 4, and other methods of measure gradient explosion/vanishing. The above measures are predictive of residual network performances in the case of fixed architecture and randomizing initialization.

$$\max\left(\left\|\frac{\partial E}{\partial w^{(L)}}\big|x=x_i\right\|\Big/\left\|\frac{\partial E}{\partial w^{(1)}}\big|x=x_1\right\|,\right.$$
$$\left.\left\|\frac{\partial E}{\partial w^{(1)}}\big|x=x_i\right\|\Big/\left\|\frac{\partial E}{\partial w^{(L)}}\big|x=x_1\right\|\right)$$

Expression 4

Given the same setup as in the case of metric expressivity, the angular expressivity is defined in Expression 5.

$$\frac{1}{\binom{n}{2}}\sum_{1\le i<j\le n}\frac{f(x_i)\cdot f(x_j)}{\|f(x_i)\|\,\|f(x_j)\|},$$

Expression 5

The angular expressivity measures how much f "decorrelates" input vectors in the sense of pulling their angle apart. So it is expected that large angular expressivity correlates with better performance. In some schemes, the predictive quantity is actually the deviation of $$\frac{f(x_i)\cdot f(x_j)}{\|f(x_i)\|\,\|f(x_j)\|}$$

from its asymptotic limit as the depth of f goes to infinity. A proxy of this asymptotic deviation is the Cauchy error $C_l - C_{(l+1)}$, where $C_l$ is the angular expressivity of the network up to the lth layer.

In some cases, the statistics can be learned automatically. Although the data-based statistics described herein are highly correlated with the final performance of the model, they might not be the most predictive statistics one can extract to predict the generalization power of a given model. The most predictive statistics might be a complex non-linear functions of the raw statistics (i.e., the embedding and the gradient measures used to compute the statistics in the previous section).

Nevertheless, like any other function approximation problem in Machine Learning, if there exist enough training data, it may be possible to learn these complex functions. This would motivate another version of the framework where the server 110 also learns predictive statistics from the raw data. In particular, some aspects could use a neural network whose input is the data representation at the last layer (i.e., f(x) above), the gradients of the last and first layers, and the like.

In a general version of some aspects, the procedure of Algorithm 1 is repeated until a predetermined desired error rate is reached or a predetermined total computation cost is reached.

Algorithm 1
1. Propose a plurality of deep neural network (DNN) architectures. The DNN architectures can be sampled from a space of pre-defined architectures or built using general building-blocks.
2. Initialize the weights of the architectures using a Glorot Normal initialization. Independent Normal distributions and Laplace distributions may be used in alternative embodiments.
3. Compute the metric expressivity and the gradient deformity for each of the architectures.
4. Include the metric expressivity and the gradient deformity of each architecture as inputs to a Bayesian recurrent neural network (Bayesian RNN) to predict architecture performance. Gaussian processes may also be used for this task. Any probabilistic machine learning algorithm that outputs a distribution over its predictions can in principle be used.
5. Use the posterior mean and variance computed using the Bayesian RNN for each of the architectures as inputs to an acquisition function such as the expected improvement, upper confidence bound or Thompson sampling.
6. Sample the architecture(s) with value(s) for the acquisition function that exceed a threshold value.
7. Train the architecture(s) with the value(s) for the acquisition function that exceed the threshold value, and evaluate their performance on a holdout set. Update the model used in operation 4 with the performance observed. Return to operation 1.

Figure 3:
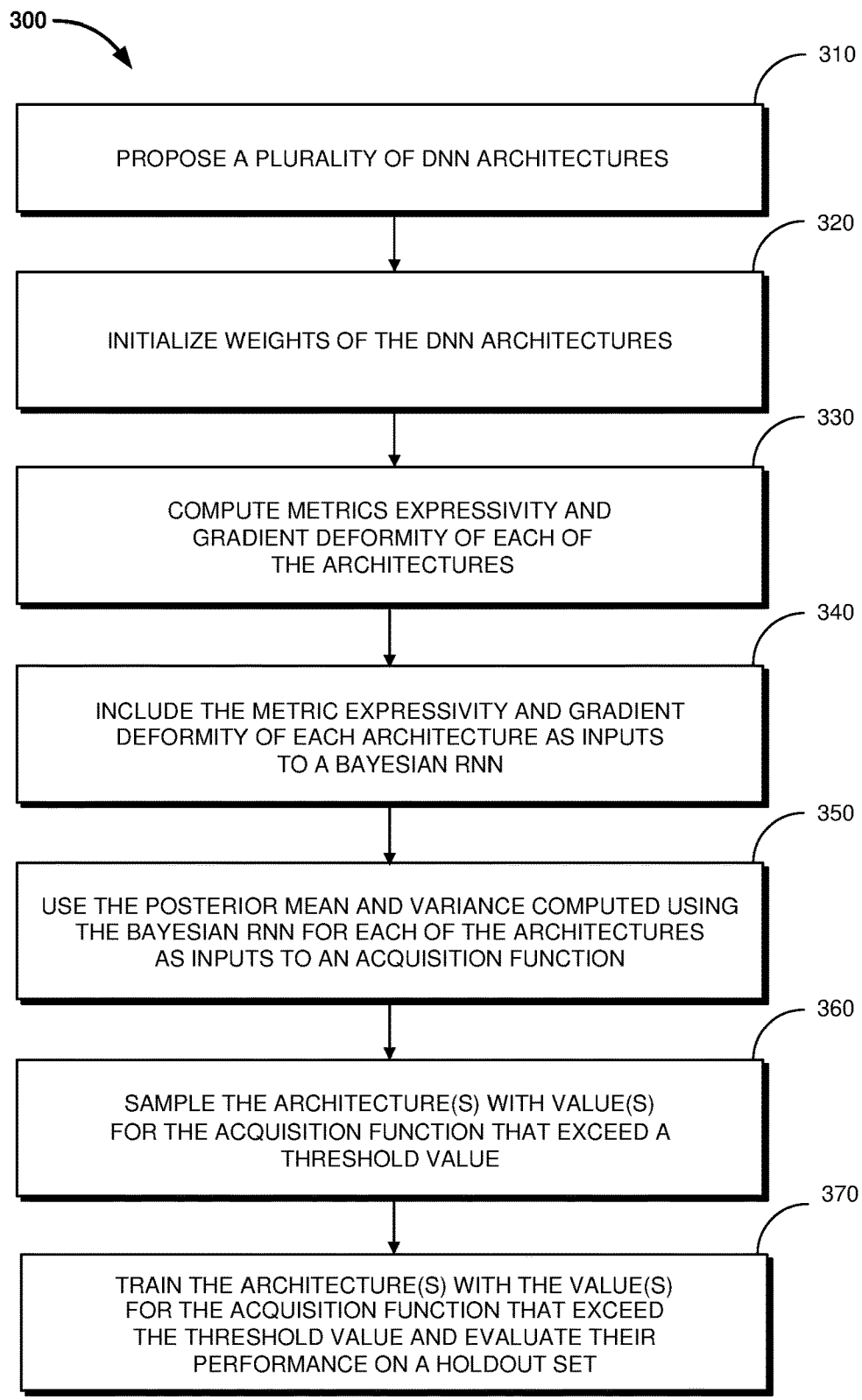
FIG. 3 illustrates a flow chart of an example method for reducing an error rate, in accordance with some embodiments.

Algorithm 1 is summarized in FIG. 3. FIG. 3 illustrates a flow chart of an example method 300 for reducing an error rate, in accordance with some embodiments.

At operation 310, a server (e.g., server 110) proposes a plurality of DNN architectures. The DNN architecture can be sampled from a space of pre-defined architectures or built using general building-blocks.

At operation 320, the server initializes the weights of the architectures using a Glorot Normal initialization. Independent Normal distributions and Laplace distributions may be used in alternative embodiments.

At operation 330, the server computes the metric expressivity and the gradient deformity of each of the architectures.

At operation 340, the server includes the metric expressivity and the gradient deformity of each architecture as inputs to a Bayesian RNN to predict architecture performance. Gaussian processes may also be used for this task. Any probabilistic machine learning algorithm that outputs a distribution over its predictions can in principle be used.

At operation 350, the server uses the posterior mean and variance computed using the Bayesian RNN for each of the architectures as inputs to an acquisition function, such as the expected improvement, upper confidence bound or Thompson sampling.

At operation 360, the server samples the architecture(s) with value(s) for the acquisition function that exceed a threshold value.

At operation 370, the server trains the architecture(s) with the value(s) for the acquisition function that exceed the threshold value and evaluates their performance on a holdout set. The Bayesian RNN model of operation 340 is updated based on the observed performance. After operation 370, if the value for the acquisition function (of operation 360) is sufficient, the method 300 ends. Otherwise, the method 300 returns to operation 310.

A specific implementation is described here. Given a fixed deep neural network architecture where a recurrent fundamental unit (the cell) is repeated multiple times, some aspects are directed to inferring the cell with highest accuracy. First, the cell is defined as a directed acyclic graph of a certain number of blocks. Each block takes two inputs ($I_1$, $I_2$), performs an operation on each of them ($O_1$, $O_2$) and returns the sum of the outputs from these two operations. The set of possible inputs for a block are the outputs of all previous blocks within a cell and the output of the previous two cells. The operations on these inputs are standard neural network layers, such as convolutional, maxpooling, and the like. Automatic and accurate search of such fundamental units in deep neural networks is important as their performance typically generalizes in applications to larger datasets. To find the best cell with B blocks, Algorithm 2 is used.

In some cases, the search in Algorithm 2 can be exhaustive as the number of cells on one block (C) can be low. For example, for 8 possible operations then the search space is 8*8*2*2-256, that can be exhaustively explored, for example, by using 256 graphics processing units (GPUs) in parallel.

Algorithm 2
1. Consider the set of cells in one block (C).
2. For each cell in C:
   Initialize the weights of the architecture using a Glorot Normal initialization. Identically distributed (iid) Normal distributions and Laplace distributions may be used in alternative embodiments.
   Compute the metric expressivity and the gradient deformity. This may be done over multiple initializations and the mean and the variance may be reported.
   Train the neural network for a fixed number of epochs.
   Compute the accuracy on the test set.
3. If the number of blocks of the cells in C is B, stop and return the cell with highest test accuracy.
4. Train a Bayesian recurrent neural network (BRNN) that takes the cell architecture and the random statistics as inputs and predicts test set accuracy.
5. Consider the set D, including the cells obtained expanding every cell in C adding a new block.
6. Compute the metric expressivity and the gradient deformity for the cells in D. If this computation is too expensive (for example, due to the large number of cells in D), one can (i) train an additional BRNN that only takes only the cell structure and predict test set accuracy and (ii) use it to filter the set D based on predicted test accuracy.
7. Use the BRNN in operation 4 to determine the set $\varepsilon \subset D$ of cells to consider in the next iteration. This decision is made by trading-off exploitation and exploration within a Bayesian optimization framework.
8. $\varepsilon \rightarrow C$ and go to step 2.

Figure 4A:
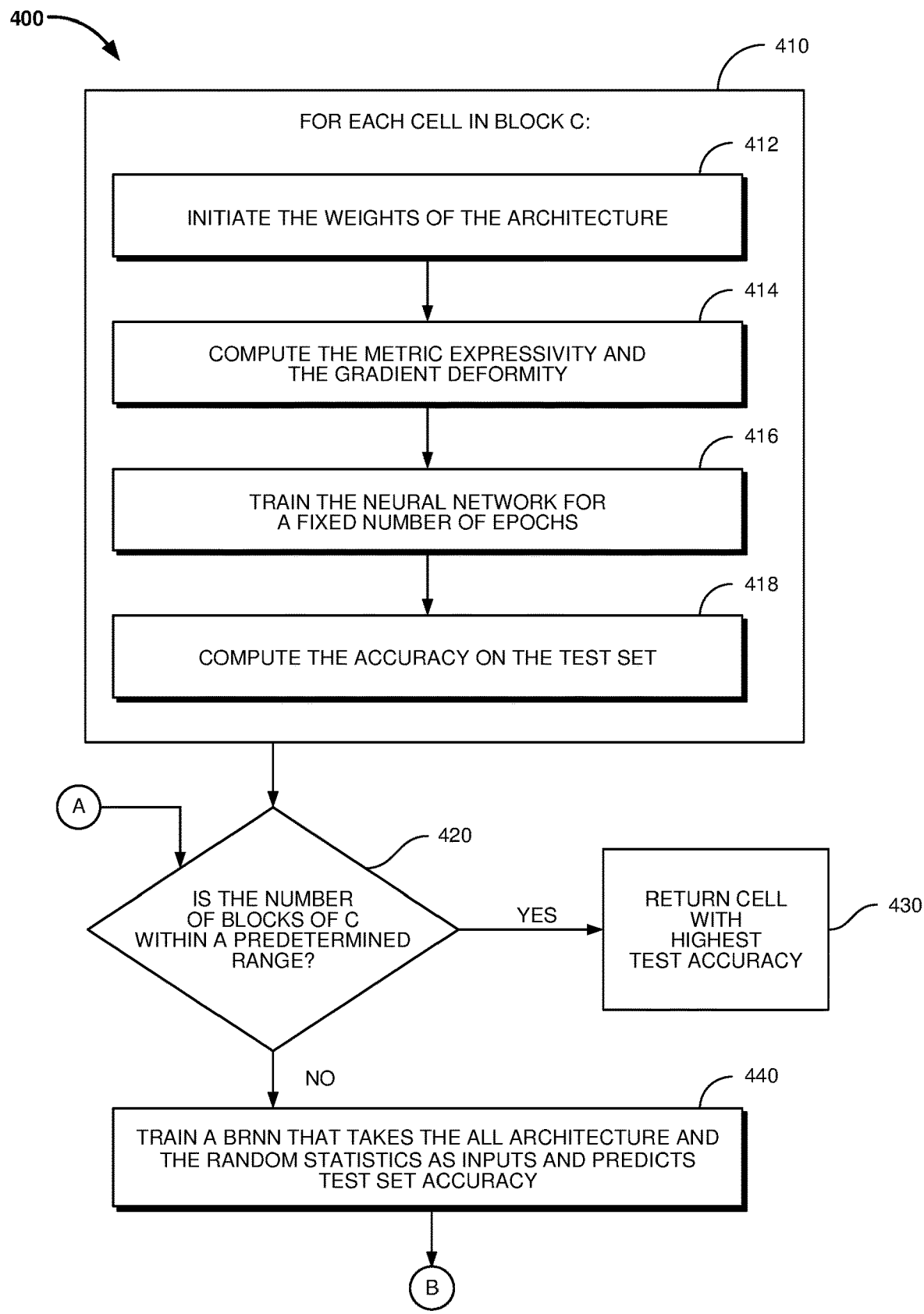
FIGS. 4A-4B illustrate a flow chart of an example method for selecting a cell from among blocks, in accordance with some embodiments.
Figure 4B:
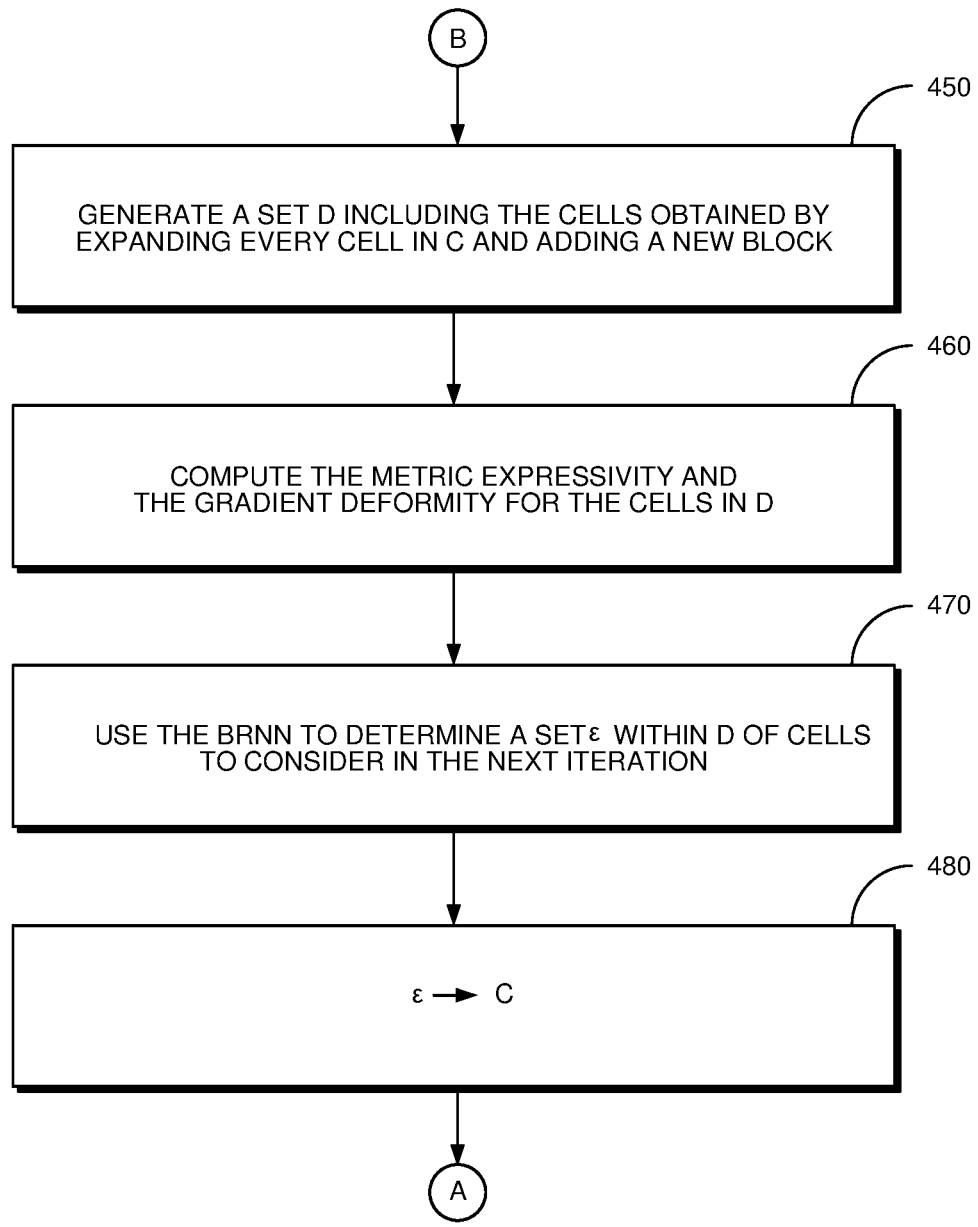

Algorithm 2 is summarized in FIGS. 4A-4B. FIGS. 4A-4B illustrate a flow chart of an example method 400 for selecting a cell from among blocks, in accordance with some embodiments.

As shown in FIG. 4A, operation 410 includes sub-operations 412-418. In operation 410, a server (e.g., server 110), for each cell in a block C, carries out the sub-operations 412-418.

At sub-operation 412, the server initializes the weights of the architecture using a Glorot Normal initialization. Identically distributed (iid) Normal distributions and Laplace distributions may be used in alternative embodiments.

At sub-operation 414, the server computes the metric expressivity and the gradient deformity. This may be done over multiple initializations and the mean and the variance may be reported.

At sub-operation 416, the server train the neural network for a fixed number of epochs.

At sub-operation 418, the server computes the accuracy on the test set. After operation 410 is completed for each cell in C, the method 400 continues to operation 420.

At operation 420, the server determines whether the number of blocks of C is within a predetermined range. If so, the method 400 continues to operation 430. If not, the method 400 continues to operation 440.

At operation 430, if the number of blocks of C is within the predetermined range, the server returns the cell in C with the highest test accuracy. After operation 430, the method 400 ends.

At operation 440, if the number of blocks of C is not within the predetermined range, the server trains a BRNN that takes the cell architecture and the random statistics as inputs and predicts test set accuracy. After operation 440, the method 400 continues to operation 450 shown in FIG. 4B.

As shown in FIG. 4B, at operation 450, the server generates a set D that includes the cells obtained expanding every cell in C adding a new block.

At operation 460, the server computes the metric expressivity and the gradient deformity for the cells in D. If this computation is too expensive (for example, due to the large number of cells in D), the server may (i) train an additional BRNN that only takes only the cell structure and predict test set accuracy and (ii) use the additional BRNN to filter the set D based on predicted test accuracy.

At operation 470, the server uses the BRNN trained in operation 440 to determine the set $\varepsilon \subset D$ of cells to consider in the next iteration. This decision is made by trading-off exploitation and exploration within a Bayesian optimization framework.

At operation 480, the server stores $\varepsilon$ as C. After operation 480, the method 400 returns to operation 420 of FIG. 4A.

NUMBERED EXAMPLES

Certain embodiments are described herein as numbered examples 1, 2, 3, etc. These numbered examples are provided as examples only and do not limit the subject technology.

Example 1 is a system comprising: processing hardware; and a memory storing instructions which cause the processing hardware to perform operations comprising: accessing a machine learning problem space associated with a machine learning problem and a plurality of untrained candidate neural networks for solving the machine learning problem; computing, for each untrained candidate neural network, at least one expressivity measure capturing an expressivity of the candidate neural network with respect to the machine learning problem; computing, for each untrained candidate neural network, at least one trainability measure capturing a trainability of the candidate neural network with respect to the machine learning problem; selecting, based on the at least one expressivity measure and the at least one trainability measure, at least one candidate neural network for solving the machine learning problem; and providing an output representing the selected at least one candidate neural network.

In Example 2, the subject matter of Example 1 includes, wherein the at least one expressivity measure represents a measure of separation, by the untrained candidate neural network, of samples from the machine learning problem space.

In Example 3, the subject matter of Example 2 includes, wherein the measure of separation is a magnitude.

In Example 4, the subject matter of Examples 2-3 includes, wherein the measure of separation is an angle.

In Example 5, the subject matter of Examples 1-4 includes, wherein the at least one trainability measure represents a stochastic gradient descent of weights in the candidate neural network during a first phase of training.

In Example 6, the subject matter of Examples 1-5 includes, wherein selecting the at least one candidate neural network for solving the machine learning problem comprises: selecting the at least one candidate neural network having the at least one expressivity measure exceeding a threshold and the at least one trainability measure within a range, wherein the range is defined by a range minimum and a range maximum.

In Example 7, the subject matter of Examples 1-6 includes, the operations further comprising: training the at least one candidate neural network to solve the machine learning problem.

In Example 8, the subject matter of Example 7 includes, the operations further comprising: running the trained at least one candidate neural network on the machine learning problem space in order to solve the machine learning problem; and providing a solution to the machine learning problem generated by the trained at least one candidate neural network.

Example 9 is a non-transitory machine-readable medium storing instructions which cause one or more machines to perform operations comprising: accessing a machine learning problem space associated with a machine learning problem and a plurality of untrained candidate neural networks for solving the machine learning problem; computing, for each untrained candidate neural network, at least one expressivity measure capturing an expressivity of the candidate neural network with respect to the machine learning problem; computing, for each untrained candidate neural network, at least one trainability measure capturing a trainability of the candidate neural network with respect to the machine learning problem; selecting, based on the at least one expressivity measure and the at least one trainability measure, at least one candidate neural network for solving the machine learning problem; and providing an output representing the selected at least one candidate neural network.

In Example 10, the subject matter of Example 9 includes, wherein the at least one expressivity measure represents a measure of separation, by the untrained candidate neural network, of samples from the machine learning problem space.

In Example 11, the subject matter of Example 10 includes, wherein the measure of separation is a magnitude.

In Example 12, the subject matter of Examples 10-11 includes, wherein the measure of separation is an angle.

In Example 13, the subject matter of Examples 9-12 includes, wherein the at least one trainability measure represents a stochastic gradient descent of weights in the candidate neural network during a first phase of training.

In Example 14, the subject matter of Examples 9-13 includes, wherein selecting the at least one candidate neural network for solving the machine learning problem comprises: selecting the at least one candidate neural network having the at least one expressivity measure exceeding a threshold and the at least one trainability measure within a range, wherein the range is defined by a range minimum and a range maximum.

Example 15 is a method comprising: accessing a machine learning problem space associated with a machine learning problem and a plurality of untrained candidate neural networks for solving the machine learning problem; computing, for each untrained candidate neural network, at least one expressivity measure capturing an expressivity of the candidate neural network with respect to the machine learning problem; computing, for each untrained candidate neural network, at least one trainability measure capturing a trainability of the candidate neural network with respect to the machine learning problem; selecting, based on the at least one expressivity measure and the at least one trainability measure, at least one candidate neural network for solving the machine learning problem; and providing an output representing the selected at least one candidate neural network.

In Example 16, the subject matter of Example 15 includes, wherein the at least one expressivity measure represents a measure of separation, by the untrained candidate neural network, of samples from the machine learning problem space.

In Example 17, the subject matter of Example 16 includes, wherein the measure of separation is a magnitude.

In Example 18, the subject matter of Examples 16-17 includes, wherein the measure of separation is an angle.

In Example 19, the subject matter of Examples 15-18 includes, wherein the at least one trainability measure represents a stochastic gradient descent of weights in the candidate neural network during a first phase of training.

In Example 20, the subject matter of Examples 15-19 includes, wherein selecting the at least one candidate neural network for solving the machine learning problem comprises: selecting the at least one candidate neural network having the at least one expressivity measure exceeding a threshold and the at least one trainability measure within a range, wherein the range is defined by a range minimum and a range maximum.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that an record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components might not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Example Machine and Software Architecture

The components, methods, applications, and so forth described in conjunction with FIGS. 1-4 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 5:
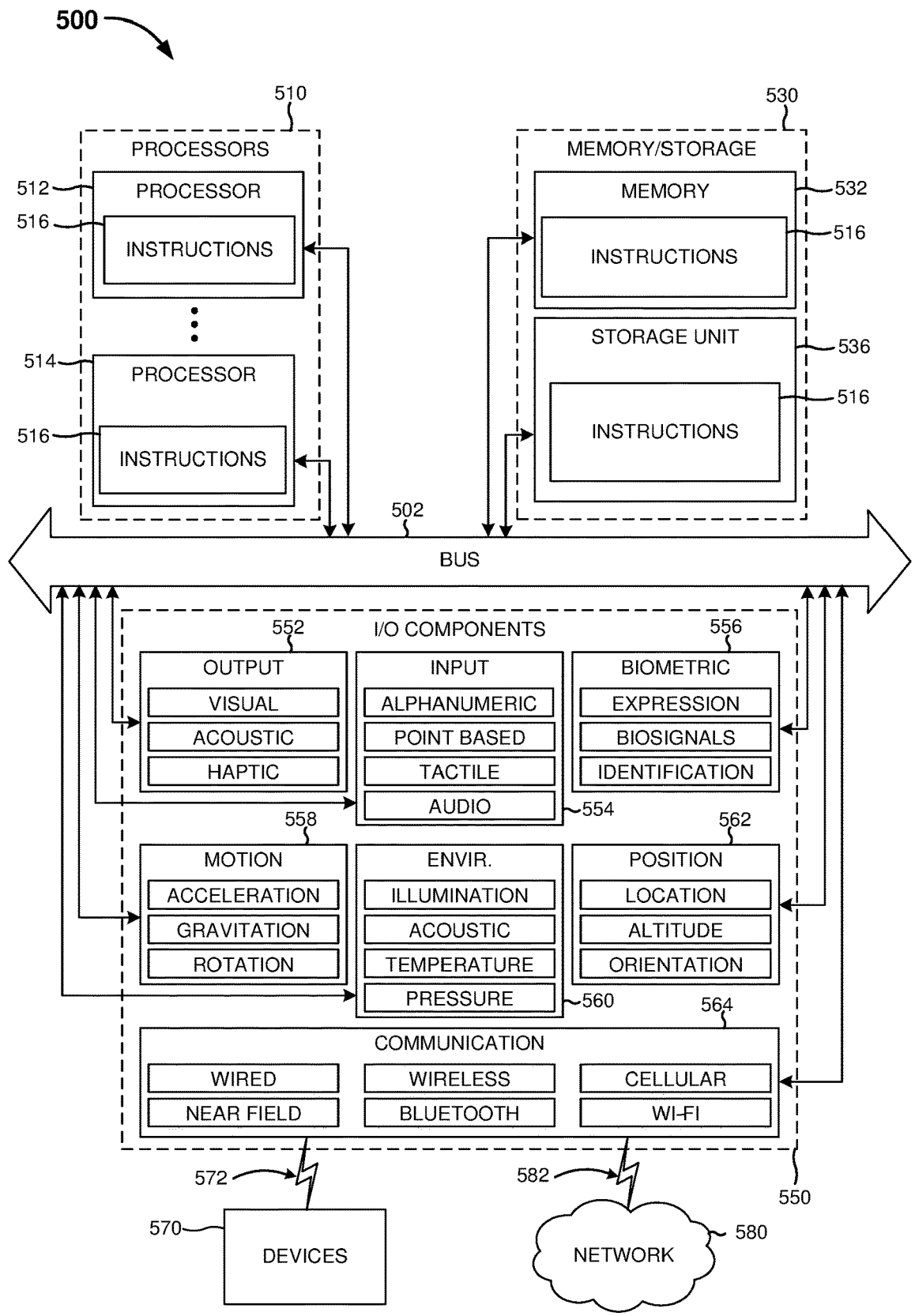
FIG. 5 is a block diagram illustrating components of a machine able to read instructions from a machine-readable medium and perform any of the methodologies discussed herein, in accordance with some embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. The instructions 516 transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components, or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

In various example embodiments, one or more portions of the network 580 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 5G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

What is claimed is:

1. A computer-implemented method comprising:
  identifying a plurality of neural network (NN) architectures for solving a machine learning problem;
  for each of the plurality of NN architectures:
    initializing weights for the NN architecture;
    calculating a metric expressivity and a gradient deformity for the NN architecture with the initialized weights;
    providing the metric expressivity and the gradient deformity as inputs to a probabilistic machine learning (ML) algorithm to predict a performance of the NN architecture, the ML algorithm providing as outputs a distribution of predictions; and
    providing the outputs of the distribution of predictions as inputs to an acquisition function;
  selecting a selected NN architecture with a value for the acquisition function that exceeds a predetermined threshold value;
  training the selected NN architecture; and
  utilizing the trained selected NN architecture to solve the machine learning problem.

2. The method as recited in claim 1, wherein the distribution of predictions further comprises a posterior mean and a variance.

3. The method as recited in claim 1, wherein initializing the weights for the NN architecture further comprises:
  initializing the weights using a Glorot normal initialization, an independent normal distribution, or a Laplace distribution.

4. The method as recited in claim 1, wherein the acquisition function is one of expected improvement, upper confidence bound, or Thompson sampling.

5. The method as recited in claim 1, wherein the NN architecture is a fixed deep neural network architecture where a cell is a recurrent fundamental unit that is repeated multiple times, wherein selecting the NN architecture is based on inferring the cell with highest accuracy.

6. The method as recited in claim 5, wherein the cell is defined as a directed acyclic graph with one or more blocks, wherein each block takes two inputs, performs a respective operation on each of the inputs, and returns a sum of the outputs from the two operations.

7. The method as recited in claim 6, wherein possible inputs for a block are the outputs of previous blocks within a cell and the output of the previous two cells.

8. A system comprising:
  a memory comprising instructions; and
  one or more computer processors, wherein the instructions, when executed by the one or more computer processors, cause the system to perform operations comprising:
    identifying a plurality of neural network (NN) architectures for solving a machine learning problem;
    for each of the plurality of NN architectures:
      initializing weights for the NN architecture;
      calculating a metric expressivity and a gradient deformity for the NN architecture with the initialized weights;
      providing the metric expressivity and the gradient deformity as inputs to a probabilistic machine learning (ML) algorithm to predict a performance of the NN architecture, the ML algorithm providing as outputs a distribution of predictions; and
      providing the outputs of the distribution of predictions as inputs to an acquisition function;

selecting a selected NN architecture with a value for the acquisition function that exceeds a predetermined threshold value;

training the selected NN architecture; and utilizing the trained selected NN architecture to solve the machine learning problem.

9. The system as recited in claim 8, wherein the distribution of predictions further comprises a posterior mean and a variance.

10. The system as recited in claim 8, wherein initializing the weights for the NN architecture further comprises:

initializing the weights using a Glorot normal initialization, an independent normal distribution, or a Laplace distribution.

11. The system as recited in claim 8, wherein the acquisition function is one of expected improvement, upper confidence bound, or Thompson sampling.

12. The system as recited in claim 8, wherein the NN architecture is a fixed deep neural network architecture where a cell is a recurrent fundamental unit that is repeated multiple times, wherein selecting the NN architecture is based on inferring the cell with highest accuracy.

13. The system as recited in claim 12, wherein the cell is defined as a directed acyclic graph with one or more blocks, wherein each block takes two inputs, performs a respective operation on each of the inputs, and returns a sum of the outputs from the two operations.

14. The system as recited in claim 13, wherein possible inputs for a block are the outputs of previous blocks within a cell and the output of the previous two cells.

15. A non-transitory machine-readable storage medium including instructions that, when executed by a machine, cause the machine to perform operations comprising:

identifying a plurality of neural network (NN) architectures for solving a machine learning problem;

for each of the plurality of NN architectures:

initializing weights for the NN architecture;

calculating a metric expressivity and a gradient deformity for the NN architecture with the initialized weights;

providing the metric expressivity and the gradient deformity as inputs to a probabilistic machine learning (ML) algorithm to predict a performance of the NN architecture, the ML algorithm providing as outputs a distribution of predictions; and providing the outputs of the distribution of predictions as inputs to an acquisition function;

selecting a selected NN architecture with a value for the acquisition function that exceeds a predetermined threshold value;

training the selected NN architecture; and utilizing the trained selected NN architecture to solve the machine learning problem.

16. The non-transitory machine-readable storage medium as recited in claim 15, wherein the distribution of predictions further comprises a posterior mean and a variance.

17. The non-transitory machine-readable storage medium as recited in claim 15, wherein initializing the weights for the NN architecture further comprises:

initializing the weights using a Glorot normal initialization, an independent normal distribution, or a Laplace distribution.

18. The non-transitory machine-readable storage medium as recited in claim 15, wherein the acquisition function is one of expected improvement, upper confidence bound, or Thompson sampling.

19. The non-transitory machine-readable storage medium as recited in claim 15, wherein the NN architecture is a fixed deep neural network architecture where a cell is a recurrent fundamental unit that is repeated multiple times, wherein selecting the NN architecture is based on inferring the cell with highest accuracy.

20. The non-transitory machine-readable storage medium as recited in claim 19, wherein the cell is defined as a directed acyclic graph with one or more blocks, wherein each block takes two inputs, performs a respective operation on each of the inputs, and returns a sum of the outputs from the two operations.

* * * * *